United States Patent [19]
Peters

[11] 3,727,958
[45] Apr. 17, 1973

[54] SELF-LOCKING COUPLING
[75] Inventor: Ralph Peters, Wolverhampton, Staffordshire, England
[73] Assignee: H. M. Hobson Limited, London, England
[22] Filed: Aug. 25, 1971
[21] Appl. No.: 174,729

[52] U.S. Cl. .................................. 287/95, 280/508
[51] Int. Cl. .............................................. F16c 11/00
[58] Field of Search ...................... 287/95; 280/508, 280/509

[56] References Cited
UNITED STATES PATENTS

| | | | |
|---|---|---|---|
| 2,429,761 | 10/1947 | Ketel | 280/508 X |
| 2,783,059 | 2/1957 | Hartl | 280/509 |
| 2,559,962 | 7/1951 | Hudson | 280/509 |
| 2,951,711 | 9/1960 | Karnath | 280/508 |

Primary Examiner—Andrew V. Kondrat
Attorney—Martin Kirkpatrick

[57] ABSTRACT

A coupling, arranged to lock automatically, in response to contact with a unit to be coupled, to couple said unit to a unit carrying the coupling, said coupling comprising a frame, a hook pivoted to the frame and spring urged to a free position, and a locking pin urged by another spring into contact with the rear face of the hook when the letter is in its free position and adapted to snap into a recess in the rear face of the hook, upon rotation of the latter into a locking position by contact with the unit to be coupled, to retain the hook in its locking position, the locking pin and the pivot of the hook being aligned, when the hook is in the locking position, with the line of action of the load exerted by or on the coupled unit.

4 Claims, 3 Drawing Figures

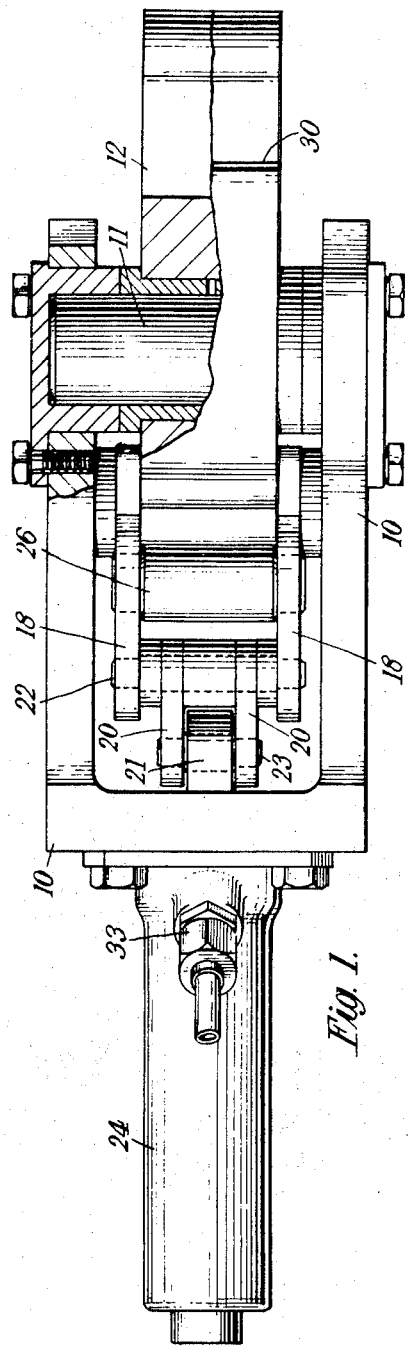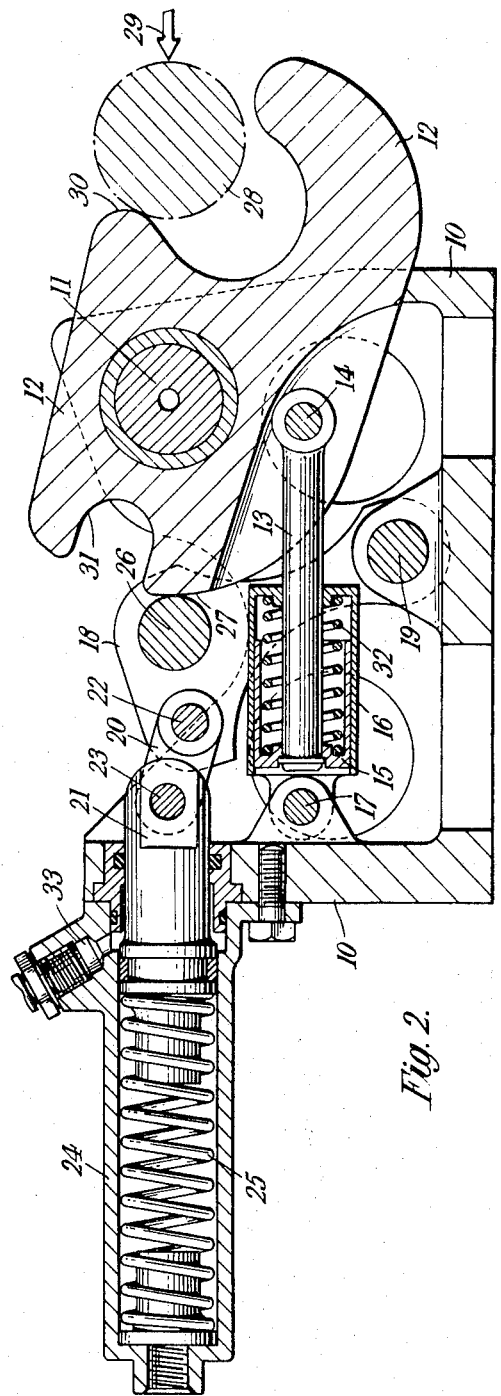
Fig. 1.
Fig. 2.

SELF-LOCKING COUPLING

This invention provides a coupling, arranged to lock automatically, in response to contact with a unit to be coupled, to couple said unit to a unit carrying the coupling, said coupling comprising a frame, a hook pivoted to the frame and spring urged to a free position, and a locking pin urged by another spring into contact with the rear face of the hook when the latter is in its free position and adapted to snap into a recess in the rear face of the hook, upon rotation of the latter into a locking position by contact with the unit to be coupled, to retain the hook in its locking position, the locking pin and the pivot of the hook being aligned when the hook is in the locking position, with the line of action of the load exerted by or on the coupled unit.

One embodiment of the invention is illustrated in the accompanying drawing, in which:

FIG. 1 is a plan view of the coupling, partly broken away;

FIG. 2 is a sectional elevation showing the coupling in the free position, and

Figure 3:
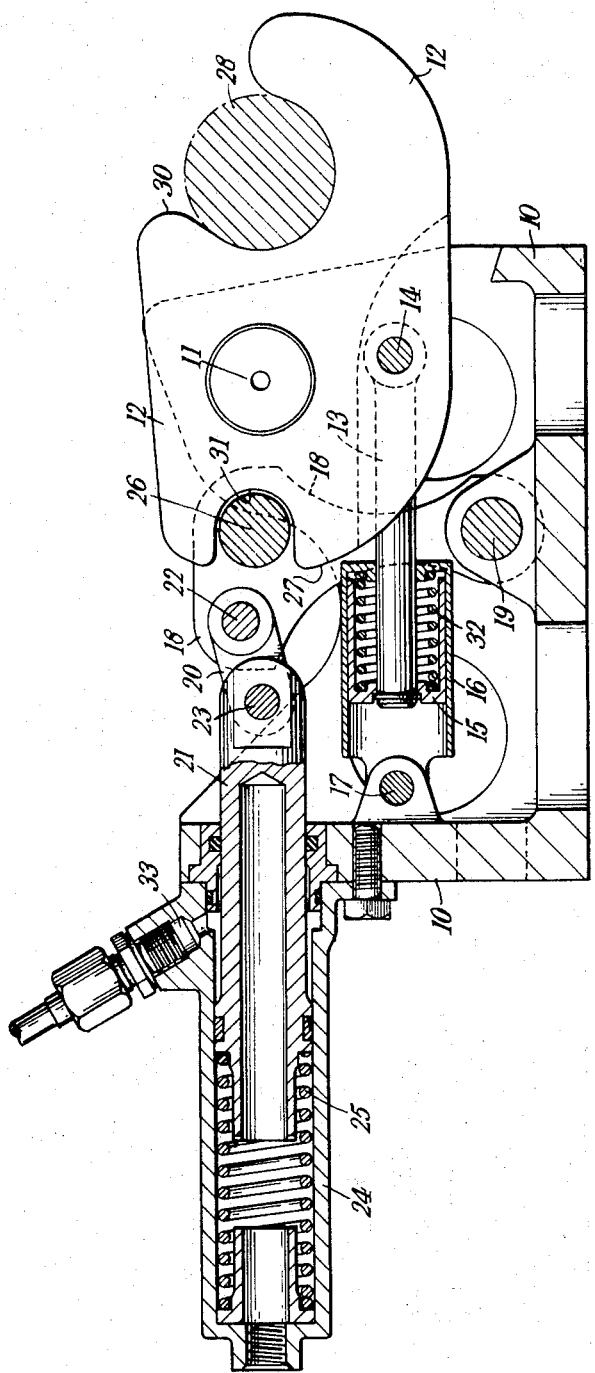
FIG. 3 is a similar view showing the coupling in the locked position.

The coupling includes a U-shaped frame 10, which carries a pin 11 extending transversely with respect to the limbs of the frame. A hook 12, pivoted on the pin 11, is connected by a link 13, pivoted to the hook at 14, to a plunger 15 movable in a cylinder 16 pivoted by a pin 17 to the frame 10. The plunger 15 is urged to the left by a spring 18 so as normally to maintain the hook 12 in the free position shown in FIG. 2.

A pair of plates 18, pivoted to the frame by a pin 19, is coupled by a pair of links 20 to a piston 21, the links 20 being pivoted at their opposite ends by pins 22,23 to the plates and to the piston respectively. The piston 21 is accommodated in a cylinder 24 fixed to the frame 10 and is urged to the right by a spring 25. In the position shown in FIG.2 the spring 25 maintains a locking pin 26 carried by the plates 18 in contact with the rear face 27 of the hook 12.

When a coupling bar 28 on a unit to be coupled to a unit carrying the frame 10, approaching in the direction of the arrow 29, contacts the heel 30 of the hook, or when such contact is made by approach of the frame to the coupling bar 28 in the reverse direction, the contact pressure at a point above the axis of the pin 11 immediately shifts the hook 12 into the locking position shown in FIG. 3, in which it is retained by engagement of the locking pin 26 in a recess 31 in its rear face. The pins 26 and 11 are now in line with the spring 25 and the line of action of the load from the coupled unit.

Accordingly no load acting in the direction of the arrow 29 is transmitted to the mechanical locking assembly. To release the coupled unit, hydraulic pressure is applied to a port 33 in the cylinder 24 to move the piston 21 against the action of the spring 25 and retract the pin 26 from the recess 31. This permits the spring 32 to return the hook 12 to the free position.

The coupling, when in the position illustrated, is suitable for use as a coupling between vehicles. It is, however, of general application, for example for locking aircraft undercarriages or fire escapes, and in association with cranes and other lifting equipment, being positioned in use so that the line of action of the load exerted by the coupled unit is aligned with the pins 11 and 26.

What I claim as my invention and desire to secure by letters patent is:

1. A coupling, arranged to lock automatically, in response to contact with a unit to be coupled, to couple said unit to a unit carrying the coupling, said coupling comprising a frame, a hook pivoted to the frame and spring urged to a free position, a locking pin, an arm pivoted to the frame and carrying the locking pin, and a piston movable in a cylinder, said pin being urged by another spring into contact with the rear face of the hook when the latter is in its free position and adapted to snap into a recess in the rear face of the hook, upon rotation of the latter into a locking position by contact with the unit to be coupled, to retain the hook in its locking position, the locking pin and the pivot of the hook being aligned, when the hook is in the locking position, with the line of action of the load exerted by or on the coupled unit, the cylinder being positioned to be aligned with the locking pin and the pivot of the hook when the hook is in its locking position, the piston being coupled to the arm and the other spring being disposed in the cylinder and acting on the piston.

2. A coupling, arranged to lock automatically, in response to contact with a unit to be coupled, to couple said unit to a unit carrying the coupling, said coupling comprising a frame, a hook pivoted to the frame and coupled by a link to a piston loaded by a spring which urges the hook to a free position, and a locking pin urged by another spring into contact with the rear face of the hook when the latter is in its free position and adapted to snap into a recess in the rear face of the hook, upon rotation of the latter into a locking position by contact with the unit to be coupled, to retain the hook in its locking position, the locking pin and the pivot of the hook being aligned, when the hook is in the locking position, with the line of action of the load exerted by or on the coupled unit.

3. A coupling, arranged to lock automatically, in response to contact with a unit to be coupled, to couple said unit to a unit carrying the coupling, said coupling comprising a frame, a hook having a recess in its rear face, a pivot pin pivoting the hook to the frame, a spring urging said hook to a free position, a locking pin, and another spring applying a force along a straight line joining the centers of said pivot pin and said locking pin, said other spring urging said locking pin into contact with the rear face of the hook so that said locking pin snaps into said recess, upon rotation of the hook from its free position into a locking position by contact with the unit to be coupled, to retain the hook in its locking position, the locking pin and the pivot of the hook being aligned, when the hook is in the locking position, with the line of action of the load exerted by or on the coupled unit.

4. A coupling as claimed in claim 1, in which the cylinder has a port for admission of hydraulic pressure to retract the locking pin from the recess in the hook.

* * * * *